(12) United States Patent
Coulson

(10) Patent No.: US 6,454,244 B1
(45) Date of Patent: Sep. 24, 2002

(54) TRELLIS POST AND METHOD OF HOLDING TENSIONED WIRES

(76) Inventor: Don J. Coulson, 11135 Condor Ave., Fountain Valley, CA (US) 92708

( * ) Notice: Subject to any disclaimer, the term of this patent is extended or adjusted under 35 U.S.C. 154(b) by 0 days.

(21) Appl. No.: 09/643,504

(22) Filed: Aug. 22, 2000

Related U.S. Application Data

(63) Continuation of application No. 29/127,898, filed on Aug. 14, 2000, now Pat. No. Des. 438,648.

(51) Int. Cl.[7] .................................................. E04H 17/00
(52) U.S. Cl. ....................... 256/1; 47/44; 47/47; 256/32
(58) Field of Search ............................. 256/1, 2, 11, 47, 256/46, 48, 54, 57, 65, DIG. 2, DIG. 3, 21, 32; 47/44, 45, 46, 47

(56) References Cited

U.S. PATENT DOCUMENTS

| | | | |
|---|---|---|---|
| 200,153 A | 2/1878 | Sickles | |
| 536,956 A | 4/1895 | Greene | |
| 794,845 A | 7/1905 | Blaine | |
| 839,723 A | 7/1906 | Bury | |
| 1,023,880 A | 4/1912 | Rubeck | |
| 1,028,630 A | 6/1912 | Stryker | |
| 1,050,589 A | 1/1913 | Young | |
| 1,117,214 A | 11/1914 | McFarland et al. | |
| 1,179,862 A | 4/1916 | Parrish | |
| 1,495,379 A | 5/1924 | Bumbaugh | |
| 3,776,522 A | 12/1973 | Bartlett | |
| 4,223,872 A | 9/1980 | Boal | |
| D413,682 S | 9/1999 | Bouchard | |
| D420,153 S | 2/2000 | Bouchard | |
| D441,105 S | * | 4/2001 | Cleary |

FOREIGN PATENT DOCUMENTS

EP          0 359 346 A1     3/1990

* cited by examiner

*Primary Examiner*—Lynne H. Browne
*Assistant Examiner*—Tomlyne A. Malcolm
(74) *Attorney, Agent, or Firm*—James G. O'Neill

(57) ABSTRACT

A metal trellis post comprises a generally triangular-shaped elongated body having a rear portion connected to a first longer leg secured to a second shorter leg. One or two rows of notches are formed in the first longer legs and the second shorter legs. Each of the notches have horizontal slots connected to vertical slots having enlarged wire holding ends. Tensioned wires for supporting foliage and fruit are securely held in the enlarged wire holding ends and may only be removed upon pressing the tensioned wires into the trellis post and around holding element and then slid to the horizontal slots for removal.

8 Claims, 2 Drawing Sheets

TRELLIS POST AND METHOD OF HOLDING TENSIONED WIRES

CROSS-REFERENCE TO RELATED APPLICATION

This application is a continuation of application Ser. No. 29/127,898, filed Aug. 14, 2000, now U.S. Pat. No. D438,648.

BACKGROUND OF THE INVENTION

1. Field of the Invention

This invention relates generally to crop support systems, and, more particularly, to an improved method and trellis post or support system that enables tensioned wires to be easily moved and/or secured in place to provide improved support to growing crops, to produce improved crop yields and to enable the crops to be more efficiently grown.

2. Description of Related Art

As is well known, crops, such as apples, cherries, grapes, kiwis, hops, etc. are usually planted in substantially parallel rows in fields, orchards, or vineyards where the foliage and growing crops are supported on tensioned wires held in trellis systems. Known systems use aligned trellis posts of various sizes utilizing tensioned wires that pass through various shaped notches or slots in adjacent posts. Foliage is trained to grow over the tensioned wires, and as the foliage grows, the growing crop, such as grapes, etc. is also trained so as to be supported by the tensioned wires. The tensioned wires must be removed from the supporting notches or slots in each trellis post and moved with the growing foliage and crop supported thereon to further notches or slots where the tensioned wires must be reinserted, so as to be supported to allow the crop to grow more efficiently.

Although current trellis posts contain notches or slots that work in limited situations, for limited periods of time, problems occur if the field, orchard, or vineyard are slopped, or uneven, or a row of trellis posts is not properly aligned. Additionally, the weight of growing foliage and crops can pull the tensioned wires from the notches or slots in existing trellis posts. Furthermore, because of the shape of the notches or slots in existing trellis posts, it is sometimes difficult to remove a tensioned wire from a first notch or slot and move it to a second, particularly, with a heavy load of foliage and crops thereon. Many attempts have been made to change the shape of these notches or slots so that they work more effectively, however, the known notches or slots still do not overcome the above-indicated problems.

Examples of know posts with various shaped notches and slots for different reasons are shown in U.S. Pat. Nos. 200,153; 536,956; 794,845; 839,723; 1,023,880; 1,028,630; 1,050,589; 1,117,214; 1,179,862; 1,495,379; 3,776,522; 4,223,872; Des.420,153; and Des.413,682. However, none of these known posts contain notches or slots that overcome the known problems Therefore, there exists a long-felt need in the art for an improved trellis post that will positively hold tensioned wires in specifically designed notches, no matter what terrain the trellis posts are used in, and which allow loaded tensioned wires to be more easily withdrawn from the notches, moved and reinserted into a further notch, as foliage grows. The present invention provides such an improvement and overcomes the aforementioned problems inherent with the use of known trellis posts or stakes. This is accomplished by providing a generally triangular-shaped trellis post, which has two opposed rows of notches into which wires may be selectively securely fastened. The trellis post is preferably made from metal, and includes notches with specifically shaped vertical side portions to enable tensioned wires to be easily inserted into and removed from the notches, and to more securely hold tensioned wires in position in the notches.

SUMMARY OF THE INVENTION

Accordingly, it is a general object of the present invention to provide an improved trellis post. It is a particular object of the present invention to provide an improved trellis post for fruit, or other crops, that more readily and securely holds wires in position. It is another particular object of the present invention to provide an improved trellis post that has a plurality of specifically formed notches therein. It is yet another particular object of the present invention to provide an improved trellis post made from metal that includes notches that are sized and dimensioned so as to securely support tensioned wires therein, and which notches allow the tensioned wires to be easily removed from one notch and moved to a further notch on the same trellis post. And, it is yet a still further object of the present invention to provide an improved method of growing crops in a tensioned wire trellis post system having notches that allow tensioned wires to be positively and securely held in position, as well as easily inserted and removed.

In accordance with the present invention, there is provided a trellis post having angled side legs secured together, and having rows of specifically shaped wire holding notches therein. Each of the wire holding notches includes a front horizontal slot connected to different shaped vertical side holding areas for positively capturing a wire therein, and which also allows the wire to be easily inserted into and removed from a notch.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for a novel and improved trellis post 10 for use in easily and more efficiently growing and then picking crops, for example, grapes growing in a vineyard.

Figure 1:
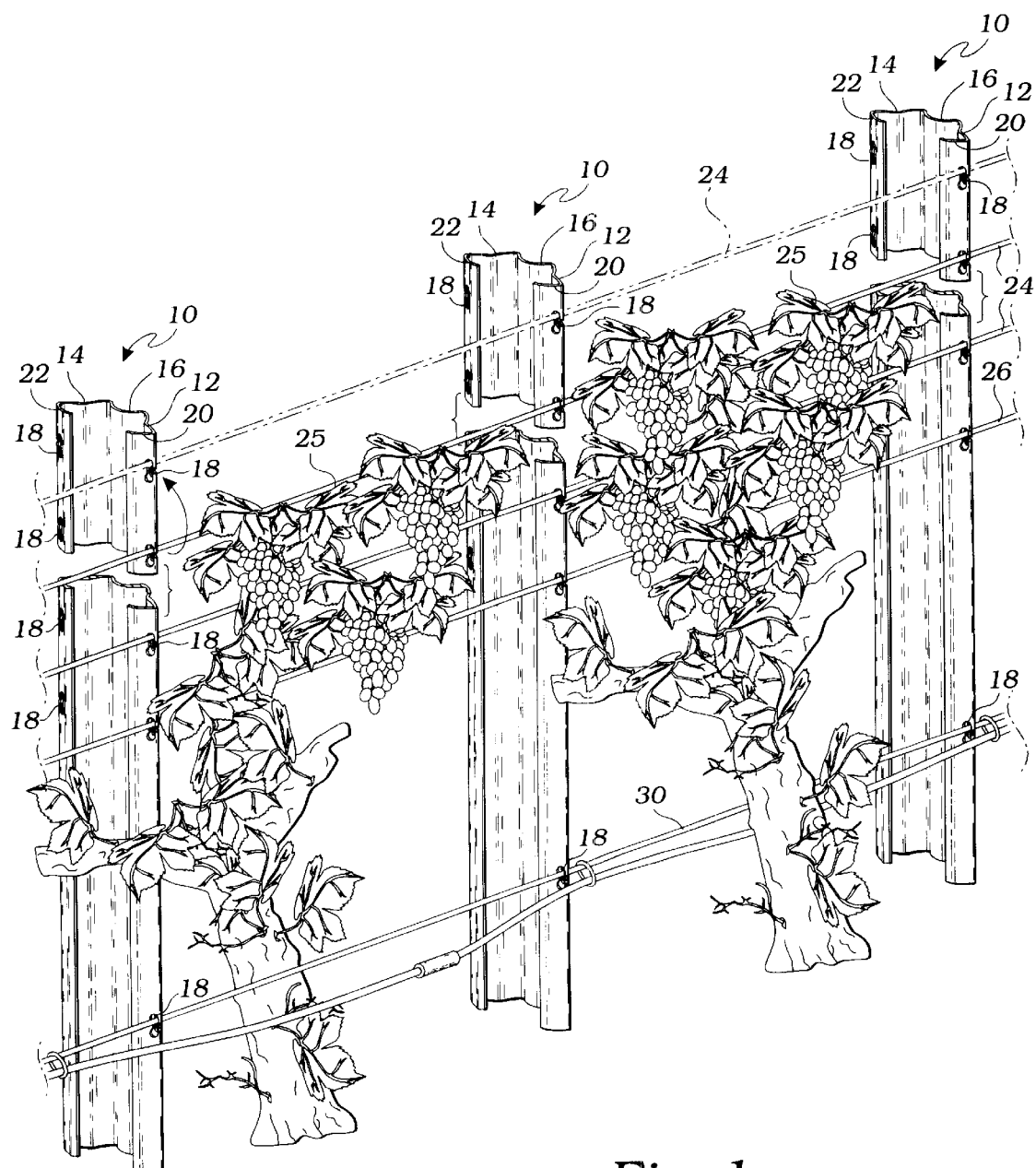
FIG. 1 is a perspective view showing a plurality of trellis posts of the present invention driven into the ground, with grape vines growing adjacent each post and trained to be supported by tensioned wires held within the unique notches in the trellis posts.

Turning now to the drawings, there shown is a currently preferred embodiment of the trellis post 10 of the present invention shown being used in a vineyard for growing grapes, for purposes of explanation only, and not by way of limitation. A plurality of trellis posts 10 of the present invention are shown in FIG. 1 as being driven into the ground so as to be supported vertically therein. It is to be understood, that any number of trellis posts 10 are aligned in multiple rows, as is well known, when used in fields, orchards, or vineyards. Each of the trellis posts 10 is preferably made from a single piece of high strength material, such as steel, or the like, and is shaped, sized and dimensioned for durability, ease in use and strength. The post 10 includes side edges having legs 12 and 14, which are preferably angled, connected together by a curved or shaped bridging member 16 that flows into each of the angled side legs 12 and 14, thereby forming a generally triangular-shaped post. The generally triangular-shaped post 10 includes a plurality of notches 18 formed in one or two rows, preferably two along opposite side edges in each side leg 12, 14, and extending into substantially perpendicular shorter leg portions 20, 22. When two rows are used, the notches 18 may be formed opposite each other on each side edge, or may alternate on each side edge. The notches 18 may be spaced apart, any desired distance, on each angled side leg 12, 14 and adjoining shorter leg portions 20, 22. For example, the notches 18 may be spaced 4" to 8" apart, so that wires 24 held therein may be moved either 4" or 8" to the next, usually higher, notch, as the foliage and crops, such as grapes 25, supported on the wires 24 grows.

FIG. 1 illustrates a plurality of trellis posts 10, supporting a plurality of tensioned wires 24 in notches 18, supporting foliage and grapes 25, for example, from grapevines growing in a vineyard. The trellis posts 10 may also be used to support a cordon wire 26, which is hard-wired to the posts as by bending a portion of the notches 18 around the cordon wire. Additionally, a drip irrigation system may be supported by a further wire 30, also hard wired or secured to lower notches 18 in the trellis posts 10.

Turning now to FIGS. 2–5, there shown is an enlarged partial view of a trellis post 10 illustrating the notch 18 and its method of use in accordance with the present invention. Each of the notches 18 includes a front or horizontal slot 32 communicating with or connected to two separate vertical wire holding openings or slots 34, 36. The separate vertical wire holding openings 34, 36 are substantially parallel to the longitudinal axis of the elongated body of the trellis post 10, and includes enlarged ends 38, 40, for securely holding wires 24 therein. The enlarged wire holding ends 38, 40 are preferably semi-circular and formed at the same side of each of the vertical wire holding slots 34, 36 (i.e., the right side when looking at FIGS. 2–4), so as to form a partial straight edge portion 42 opposite one end of the horizontal slot 32 in vertical opening 34, between curved or semi-circular ends, as well as a straight side edge 44 and a pair of extending fingers or holding elements 46 in vertical opening 36.

Figure 2:
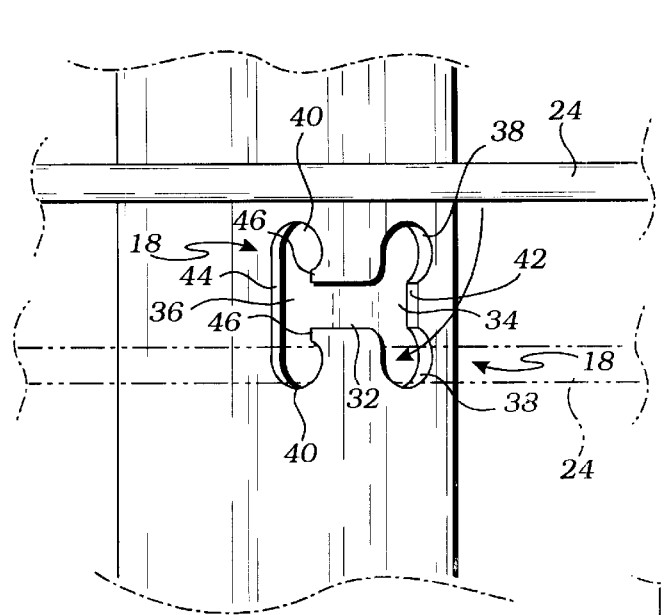
FIG. 2 is an enlarged partial view of one of the unique notches of the trellis post of the present invention, showing how a wire is inserted into the notch.

A wire 24 is inserted in a notch 18, as shown in FIG. 2, by holding the wire horizontal, or perpendicular to the longitudinal axis of the elongated body and inserting the wire through the horizontal slot 32 until the wire contacts the partial straight edge portion 42 and the straight side edge 44. The wire 24 is then slid upwardly or downwardly in the vertical wire holding openings 34, 36, until the wire enters and is captured in aligned, enlarged wire holding portions 38, 40 at either end of the vertical openings. For example, as shown in phantom line in FIG. 2, the wire 24 is positively captured and securely held in the aligned lower wire holding portions 38, 40. When the wire 24 is in the aligned wire holding portions 38, 40, the extending finger or holding element 46 in the left vertical opening 36, and an abutting end of the partial straight edge portion 42 in the right vertical opening 38 will prevent the wire from moving or becoming detached from the notch. That is, as opposed to known notches, the weight of growing foliage and crops, the slope of the land in which adjacent trellis posts are placed, the alignment of adjacent trellis posts, etc. will not cause the wire 24 to become accidentally detached from the aligned wire holding portions 38, 40 in the notch 18.

Figure 5:
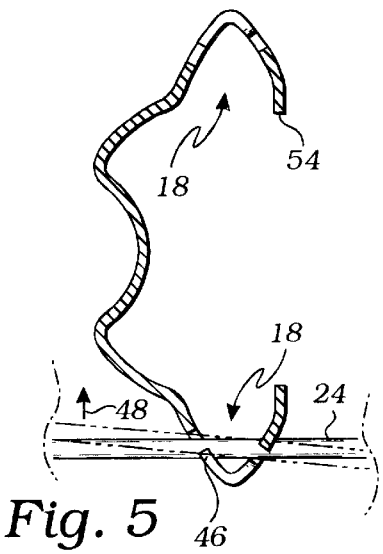
FIG. 5 is a cross-sectional view taken along line 5—5 of FIG. 3, showing how the wire is moved to remove it from the notch.
Figure 3:
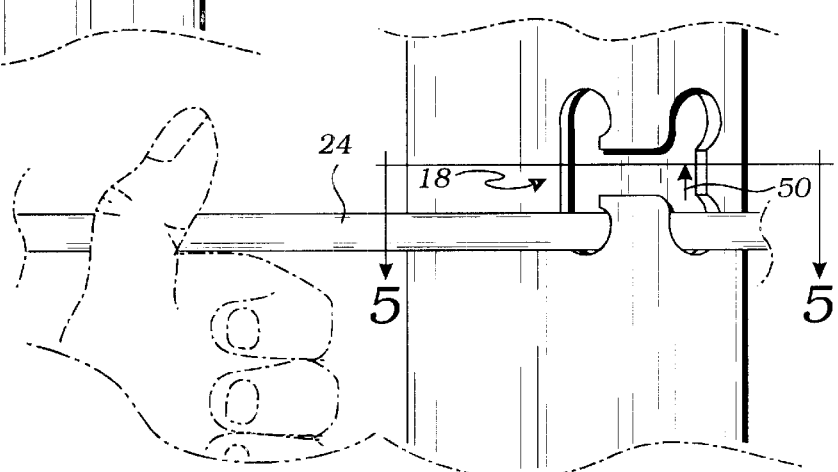
FIG. 3 is a further enlarged partial view of the notch of FIG. 2, with a wire captured therein, showing how the wire may be removed from the notch.
Figure 4:
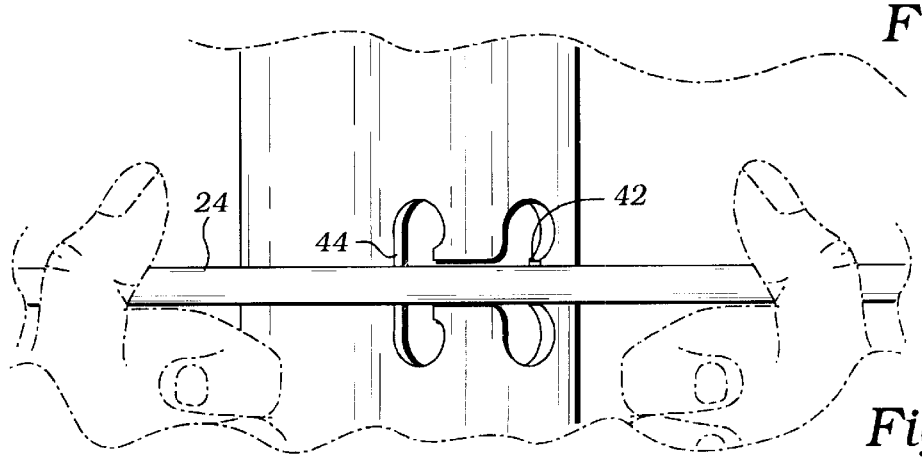
FIG. 4 is a further enlarged partial view, similar to FIG. 3, showing how the wire is removed through a front horizontal slot of the notch.

As best shown in FIGS. 3–5, to remove the wire 24 from a notch 18, the wire is first pushed in or rotated toward the longitudinal axis of the elongated body, in the direction of arrow 48 (FIG. 5), to clear the extending finger or holding element 46. The wire 24 may then be lifted, moved, or slid upwardly in the direction of the arrow 50 (FIG. 3), toward the horizontal slot 32, and removed from the notch 18 through the horizontal slot 32, as shown in FIG. 4. The wire 24 may then be moved to an adjacent or higher notch 18, and easily inserted and secured therein, as described above and as illustrated in phantom line in FIG. 1, to accommodate growing foliage, and greatly increase the crop yield, without the attendant problems with known trellis posts and methods.

It, therefore, can be seen that the preferred embodiment of the present invention provides an improved trellis post and method for allowing crops, such as grapes, or the like, to be grown and supported by movable tensioned wires securely held within unique notches in the trellis posts. The wires are easily and quickly removable from the notches when the foliage grows, and are easily inserted and positively captured in the notches. The trellis post is preferably made from metal, and is firmly held in the ground adjacent a growing plant, tree or vine. The metal trellis post of the present invention is specifically dimensioned, sized and shaped for added strength and to allow up to two rows of notches 18 to be formed on opposite side edges thereof.

The improved trellis post 10 of the present invention is preferably formed from one piece of material in a triangular-shape with the curved connecting portion or rear 16, extruded or otherwise formed therein for added strength. The trellis post 10 also preferably includes an open portion or space 54 between outer ends of the two shorter or perpendicular legs 20, 22.

From the above description, it can be seen that the improved trellis post and method of the present invention, particularly because of the novel notches used therein, allows wire-tensioned systems to be used to grow crops in a more expeditious manner, and furthermore, allows the tensioned wires to be easily inserted into and captured in the notches, and easily removed and moved, with growing foliage supported thereon, to a higher notch to allow for support of the foliage and crops being grown.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A trellis post for supporting growing foliage of plants, trees, or vines, including the following:

an elongated trellis post having a generally triangular-shaped body adapted to be driven into the ground;

the generally triangular-shaped body having side edges with a first longer leg and a second shorter leg;

a plurality of notches formed in at least one of the side edges extending into the first longer leg and the second shorter leg;

each of the plurality of notches having a horizontal front slot and a pair of vertical openings connected to the horizontal front slot;

first of the pair of vertical openings including a straight side edge and a pair of wire-holding elements; and a second of the pair of vertical openings includes a partial straight edge portion formed opposite a first open end of the horizontal front slot.

2. The trellis post of claim 1 wherein there are two rows of notches formed in the side edges.

3. A trellis post for supporting a plurality of tensioned wires for growing foliage and produce, comprising, in combination:

an elongated body having a first end and a second end and at least one row of notches formed in one of two opposed side edges;

the two opposed side edges having a first longer leg perpendicularly attached to a second shorter leg;

the at least one row of notches being formed in the first longer leg and the second shorter leg;

each of the notches having a horizontal front slot, perpendicular to the first longer leg and the second shorter leg, connected to a pair of vertical openings extending along the elongated body parallel to a longitudinal axis thereof; the pair of vertical openings having enlarged wire-holding ends;

the enlarged wire-holding ends formed in each of the vertical openings being semi-circular and connected by straight edge portions; and the straight edge portions being different lengths, with a shorter of one of the straight edge portions being formed opposite an open end of the horizontal front slot.

4. The trellis post of claim 3 wherein the trellis post has a generally triangular-shaped elongated body having two side edges and there is a row of notches formed in each of the two side edges.

5. A trellis post for supporting a plurality of tensioned wires for growing foliage and produce, comprising, in combination:

an elongated body having a first end and a second end and at least one row of notches formed in one of two opposed side edges;

the two opposed side edges having a first longer leg perpendicularly attached to a second shorter leg;

the at least one row of notches being formed in the first longer leg and the second shorter leg;

each of the notches having a horizontal front slot, perpendicular to the first longer leg and the second shorter leg, connected to a pair of vertical openings extending along the elongated body parallel to a longitudinal axis thereof; the pair of vertical openings having narrow portions opposite open ends of the horizontal front slot and enlarged wire holding ends;

a first of the pair of vertical openings including a straight side edge and a pair of holding elements formed at opposite sides of a first of the open ends of the horizontal front slot; and a second of the pair of vertical openings including a partial straight edge portion formed opposite a second of the open ends of the horizontal front slot.

6. The trellis post of claim 5 wherein there are two rows of notches formed in the opposed side edges.

7. The trellis post of claim 5 wherein the enlarged wire-holding ends formed in each of the vertical openings are semi-circular and connected by different length straight edge portions.

8. The trellis post of claim 7 wherein the different length straight edge portions include a first shorter straight edge portion formed opposite a first open end of the horizontal front slot.

* * * * *